United States Patent

[11] 3,581,890

[72] Inventors Donald D. DeMuzio
Reading;
Russell W. Ingham, Wyomissing, both of, Pa.
[21] Appl. No. 846,111
[22] Filed July 30, 1969
[45] Patented June 1, 1971
[73] Assignee Western Electric Company, Incorporated
New York, N.Y.

[54] METHODS OF AND APPARATUS FOR SORTING ARTICLES
22 Claims, 9 Drawing Figs.

[52] U.S. Cl. .................................................. 209/74,
209/81, 209/111.8, 324/73
[51] Int. Cl. ...................................................... B07c 5/00
[50] Field of Search .......................................... 209/73, 74,
74 M, 81, 111.8; 324/158, 73

[56] References Cited
UNITED STATES PATENTS

| | | | |
|---|---|---|---|
| 2,771,992 | 11/1956 | Artingstall et al. ........... | 209/73(X) |
| 3,388,795 | 6/1968 | Beroset et al. ................ | 209/74 (X) |

Primary Examiner—Richard A. Schacher
Assistant Examiner—Gene A. Church

Attorneys—H. J. Winegar, R. P. Miller and R. Y. Peters

ABSTRACT: Magnetic articles, for example, diodes having magnetic leads, are loaded onto an indexable feed drum and into testing positions arranged in spaced clusters. Each diode is supported within one of the clusters with equal spacing between adjacent diodes. The drum is indexed so that one cluster at a time is placed beneath a reciprocating testing fixture. The fixture is lowered into engagement with the diodes of a cluster and those diodes having a desired characteristic, in this case low internal noise, are detected. Each segment of the testing fixture is independently linked to an electromagnet positioned on a rotatable sorting drum. The sorting drum is mounted to rotate mutually with the feed drum so that each of the electromagnets of the sorting drum becomes adjacent a particular one of the diodes of a cluster. Each of the electromagnets which is associated with a segment of the testing fixture in which a high noise level has been detected in a diode is energized and when such electromagnet moves past the associated diode on the feed drum, such diode is attracted to the electromagnet of the sorting drum and is subsequently collected from the sorting drum. Diodes having suitably low noise levels move past the sorting drum without being attracted by one of the electromagnets since the electromagnets adjacent the low noise diodes are not energized. Such low noise diodes are collected in a separate facility. Sorting of the diodes in accordance with their noise level is thereby accomplished.

INVENTORS
D.D. DeMUZIO
R.W. INGHAM
BY [signature]
ATTORNEY

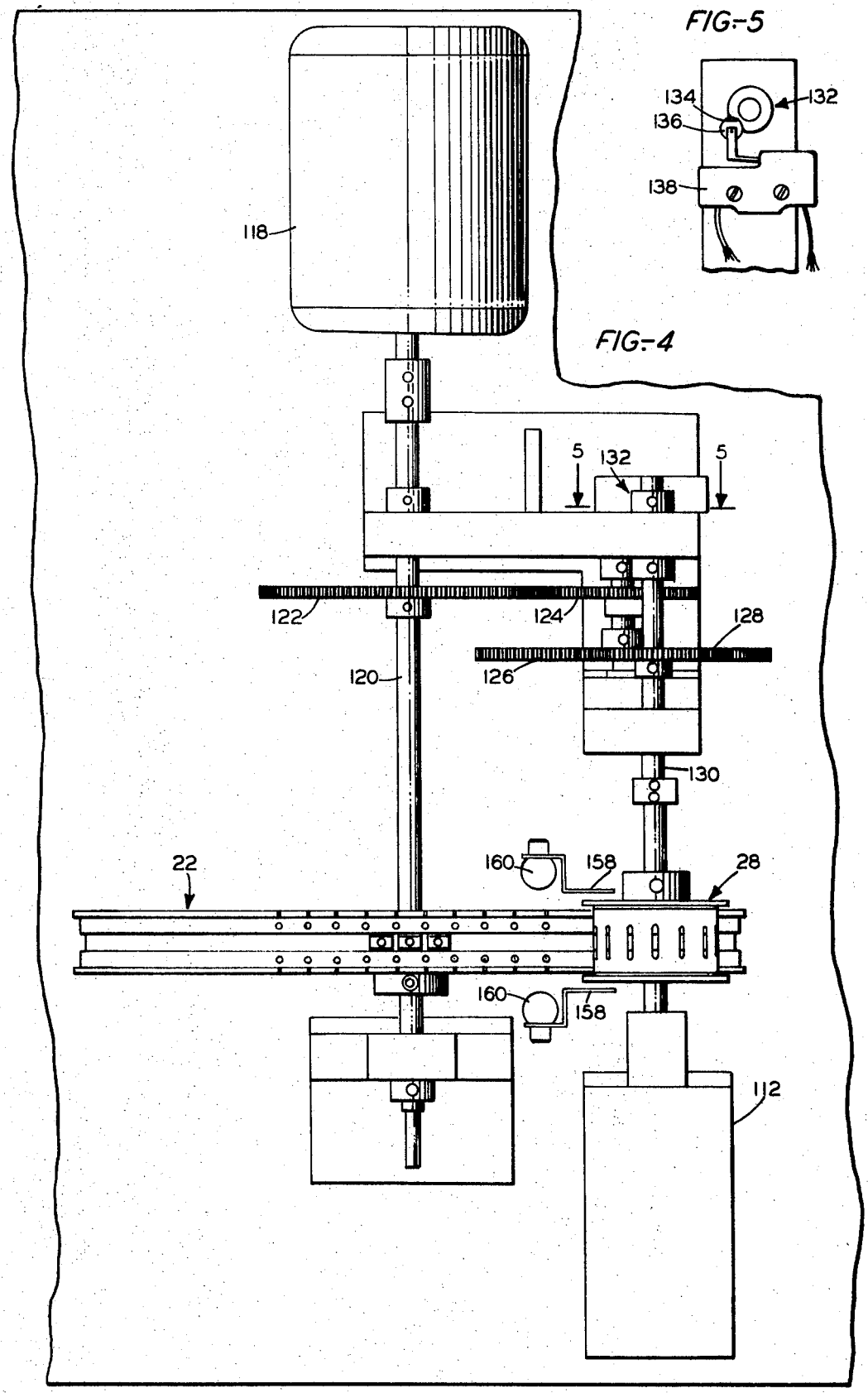

METHODS OF AND APPARATUS FOR SORTING ARTICLES

FIELD OF THE INVENTION

This invention relates to methods of and apparatus for sorting articles in accordance with the article having or not having a predetermined characteristic. More particularly, the invention relates to sorting the articles by rotating a drum in proximity to the articles to attract selected ones of the articles to the surface of the drum.

DESCRIPTION OF THE PRIOR ART

In the manufacture of discrete electrical components, such as low power diodes, it is often a desirable but not necessarily economically sound practice to perform a substantial amount of testing on such components. Difficulties encountered in handling large numbers of the components into and out of a multiplicity of testing positions often increases the cost of the individual components beyond competitive levels.

Cost problems associated with testing of components such as diodes are exaggerated by testing such components for characteristics which require a substantial time delay during a test cycle. One difficult area in this regard has been a need to determine the integrity of bonding between axial leads and a silicon semiconductor chip assembled as a low power diode. One useful technique for determining the integrity has been to subject the diode to a stressing bias and then detecting noise developing within the diode structure over a predetermined period of time, usually a matter of a few seconds. If the noise level stays below a predetermined standard during the time period of the test, the diode is considered to have satisfactory bonding between its various elements.

The problems associated with long testing cycles have been reduced in the past by loading a plurality of testing fixtures with the components to be tested and then simultaneously performing the test on all of the loaded components. It has been a long standing problem however, to provide efficient and rapid systems for loading such testing fixtures with the components to be tested and unloading the fixtures after testing.

One of the difficulties surrounding a solution of these problems is the speeds at which the diodes can be transferred from one system to another under selective conditions. These needs for transferring arise in situations where diodes have been found to have a particular test characteristic and are to be sorted from a lot on the basis of that test characteristic. In the prior art, sorting of the articles has usually taken place within apparatus that utilizes moving mechanical members that are selectively engaged with the articles for achieving the desired transfer at appropriate times.

In most cases, the mass of the mechanical members accomplishing the transfer has greatly exceeded the mass of the articles being transferred. Thus, the speed of transfer has been limited by the ability of the apparatus to accelerate the mechanical members rapidly. Extreme acceleration of mechanical members causes deterioration and wear of the members because of impact loading that occurs during the accelerations.

It is desirable therefore to have transfer systems in which the structural members thereof operate when either at rest or when moving at some uniform velocity so that rapid accelerations are not required. If such at rest or uniform-velocity types of operation are obtainable, then a transferring system can be made to operate at speeds which are limited only by the forces that develop in accelerating the actual article during the time of transfer. The low power diodes under consideration here are extremely low mass articles and, thus, can be accelerated very rapidly with only minimal force being applied thereto, and transfer systems that do not require acceleration of mechanical members can operate at much higher speeds for these types of low mass articles than those systems which are limited by the rate at which the mechanical members can be accelerated.

The prior art also includes sorting systems wherein articles are conveyed along and allowed to drop by gravity into various bins associated with their characteristics. Use of a gravitational field for causing acceleration of articles during a dropping from a conveying system has inherent speed limitations, as a technique, because the acceleration of the articles in a gravitational system is limited to the well-known 32 ft./sec$^2$.

SUMMARY OF THE INVENTION

It is, therefore, an object of this invention to provide methods of and apparatus for selectively transferring articles from a conveying system with transfer speeds limited inherently only by the force required to accelerate the transferred articles.

It is another object of this invention to provide methods of and apparatus for rapidly engaging and disengaging articles with a fixture in which a plurality of the articles are tested simultaneously.

It is a further object of this invention to combine a high-speed transfer process, wherein the speed of transfer is inherently limited only by the force required to accelerate the transferred articles, with a testing fixture wherein the transfer system is utilized to sort articles which have been determined to possess a predetermined characteristic by the testing fixture.

The foregoing and other objects are accomplished in accordance with the invention by engaging a testing fixture with a plurality of spaced articles to detect ones of the articles having a predetermined characteristic. The test results are utilized to selectively actuate attractive positions on a rotatable drum, the positions being spaced around the drum so that when rotation of the drum occurs, successive ones of the positions become adjacent successive ones of the articles. The positions are selectively actuated, in response to the test results, in such a pattern that when one of the positions is adjacent an article having the predetermined characteristic, the articles is attracted to the drum. Articles not having the characteristic are not attracted. Thus, sorting of the articles is accomplished.

DETAILED DESCRIPTION OF THE DRAWINGS

Other objects and features of the present invention will be more readily understood from the following detailed description of a specific embodiment thereof when read in conjunction with the appended drawings in which:

FIG. 4 is a plan view of the machine of FIG. 1 with a feed bin portion and a testing fixture removed for purposes of clarity;

FIG. 5 is a view of a cam switch portion of the machine of FIG. 4 taken along the line 5–5;

DETAILED DESCRIPTION

Illustratively, the invention is described in connection with testing and sorting diodes having magnetic axial leads in accordance with noise levels generated during application of a stressing bias. However, it is to be understood that this is only for purposes of explanation and that the invention has applicability to sorting of many types of articles in accordance with any detectable characteristic.

Figure 1:
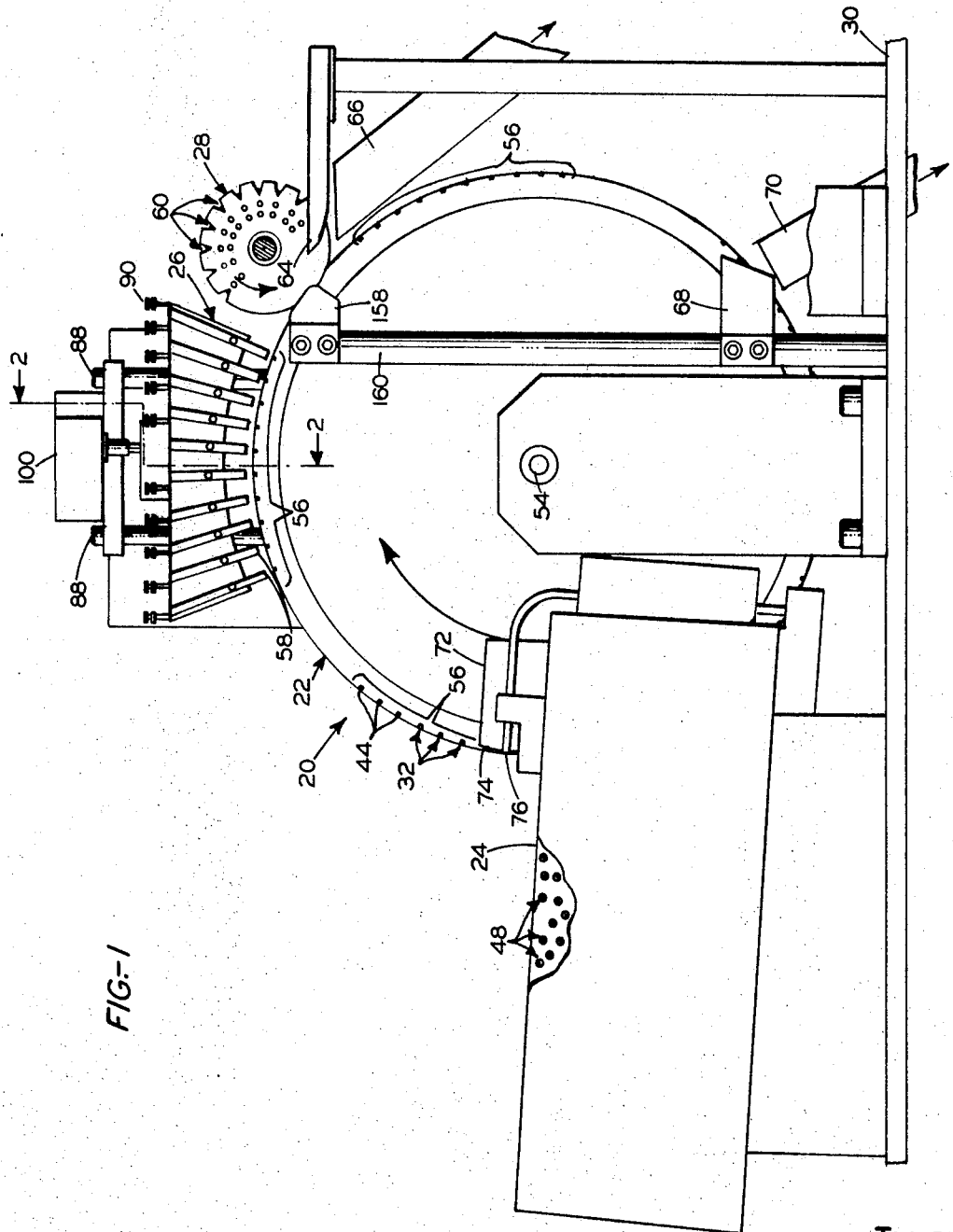
FIG. 1 is an illustration of a general arrangement of the inventive sorting machine with portions thereof removed for purposes of clarity.

Referring now to FIG. 1, there is shown a sorting machine designated generally by the numeral 20. The sorting machine includes a feeding means or rotatable feed drum, designated generally by the numeral 22, of a magnetic feed bin, designated generally by the numeral 24, a detection fixture, designated generally by the numeral 26 and a rotatable sorting drum, designated generally by the numeral 28. The various components of the sorting machine 20 are mounted on a base 30.

Figure 2:
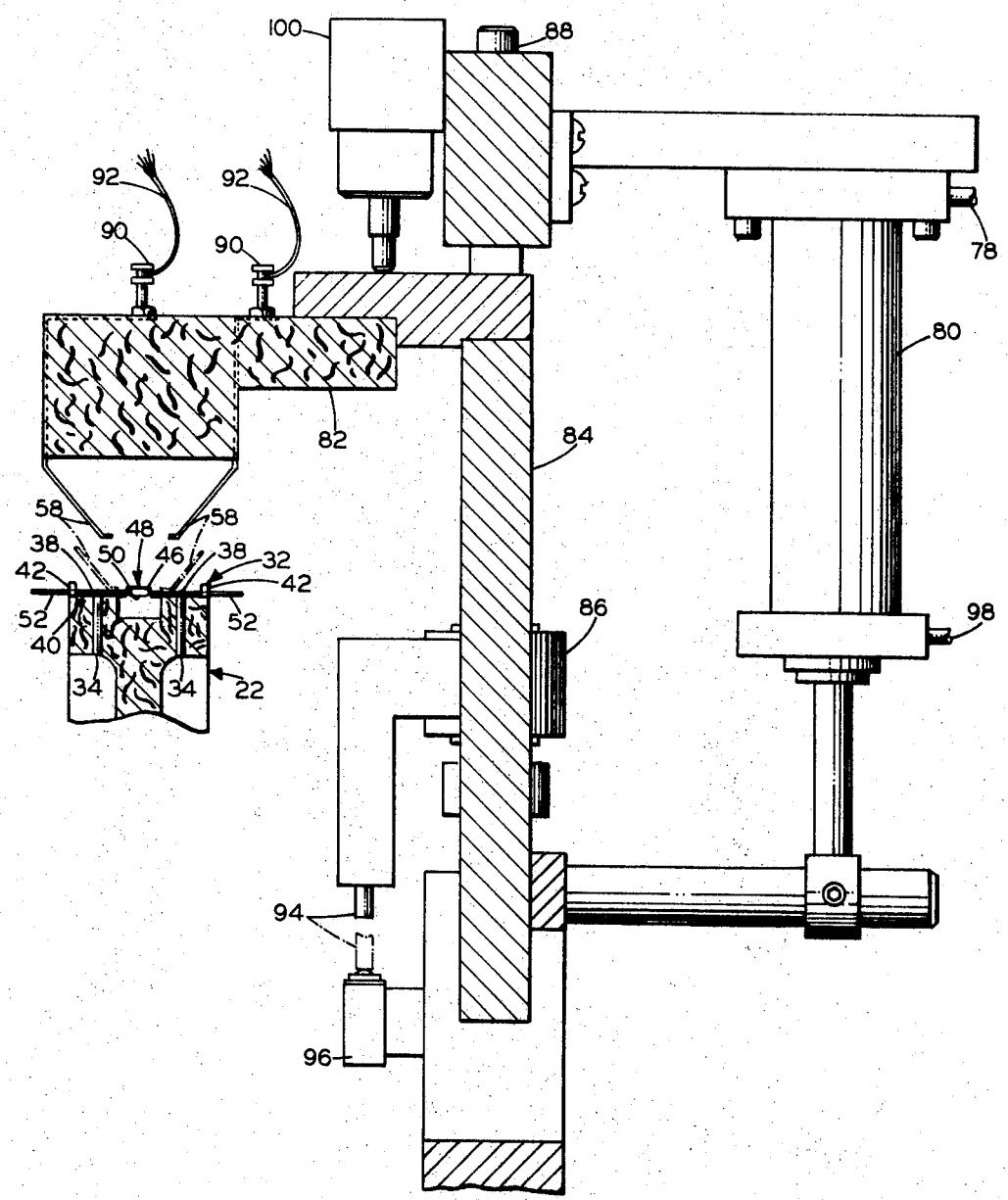
FIG. 2 is a sectional view taken along the line 2–2 illustrating the interrelationship of a testing fixture with a feed drum of the machine of FIG. 1.
Figure 3:
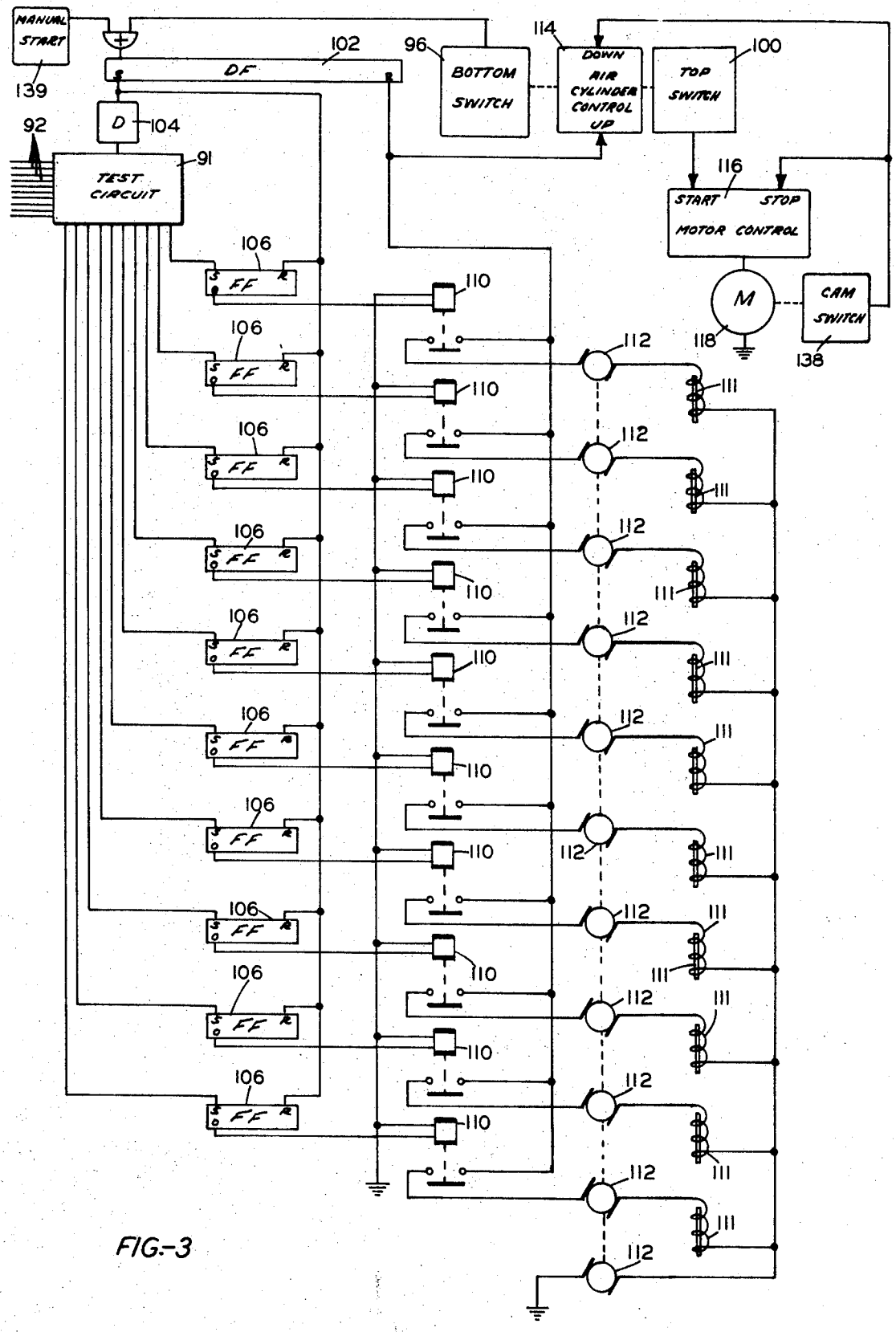
FIG. 3 is a schematic diagram illustrating the overall operation of the machine of FIG. 1.
Figure 6:
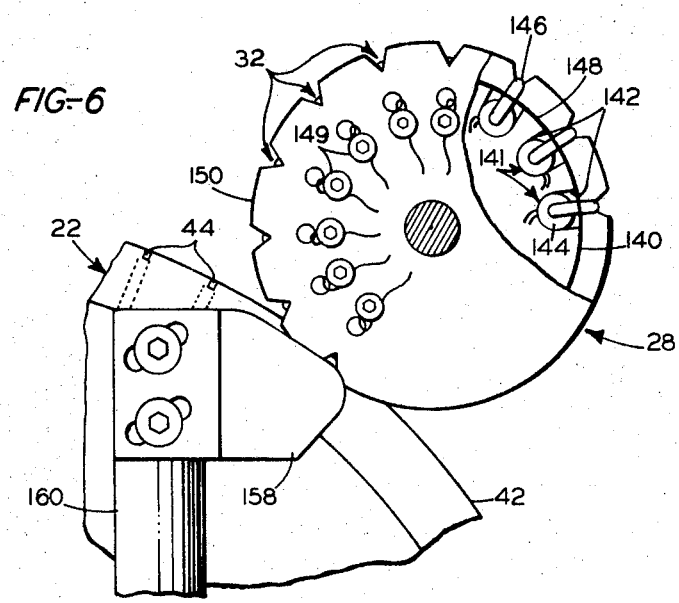
FIG. 6 is an enlarged view of a sorting drum of the machine of FIG. 1 engaged with a portion of a feed drum of said machine.

In FIG. 2, a partial section through a peripheral portion of the drum 22 is illustrated. The view of the drum in FIG. 2 illustrates a peripheral portion of the drum that is referred to hereinafter as a feeding position and designated generally by the numeral 32. Each of the feeding positions includes two permanent magnets 34 inserted into the drum 22 so that ends 38 of the magnets 34 are flush with a supporting surface 40. Flanges 42 project outwardly from the supporting surfaces 40 around the periphery of the drum 22. Each of the flanges 42 is provided with a notch 44 (see FIG. 1) at each of the feeding positions 32. A spacer block 46 is inserted into the drum 22 between each of the testing positions 32.

An article in this case, a diode, designated generally by the numeral 48, is supported within the feeding position as illustrated in FIG. 2. A body portion 50 rests between adjacent ones of the blocks 46. Magnetic leads 52 extend axially from the body portion 50 across the supporting surface 40 and through the notches 44. The magnets 34 hold the leads 52 in place against the support surface 40.

GENERAL OPERATION

Referring back now to FIG. 1, a generalized explanation of the operation of the machine 20 follows. The diodes 48 are magnetically fed to the feed drum 22 by the feed bin 24. A detailed and explicit description of the operation of the feed bin 24 in feeding articles to the drum 22 is set forth in a U.S. Pat. application filed in the names of J. E. Beroset and D. M. Large on Sept. 30, 1968, Ser. No. 763,860, and assigned to the assignee of record of this application.

The drum 22 is indexed on a shaft 54. Indexing is accomplished in alternating periods of rotation and dwell. One period of rotation rotates the drum a sufficient angular displacement to move a cluster 56 of the feeding positions 32 into position beneath the testing fixture 26. There are five of the clusters 56 equally spaced about the periphery of the drum 22. Each of the clusters 56 includes ten of the feeding positions 32. The feeding positions 32 are spaced apart a sufficient distance to preclude "crosstalk" between the diodes 48 during noise testing. The angular displacement between the centers of the first one of the notches 44 and the last one of the notches 44 of one of the clusters 56 is 45°. The angular displacement between centers of adjacent ones of the clusters 56 is 72°. One step of rotation of the drum 22 generates an angular displacement of the drum of 72°.

During the dwell period of the indexing, the test fixture 26 is lowered so that contacts 58 thereof are engaged with the leads 52, as shown in FIG. 2. Testing of the diodes proceeds during the dwell period, in this case, 1.8 seconds. If excessive noise is detected within any one of the diodes 48 supported in the cluster 56 undergoing test, a particular one of a plurality of selectively actuable magnetic sorting positions designated generally by the numeral 60 mounted on the sorting drum 28 is energized.

The sorting drum 28 is provided with ten of the sorting positions equally spaced about a portion of the periphery thereof. Angular spacing between the sorting positions 60 of the sorting drum is proportional to angular spacing of the notches 44 of the feed drum 22. Each of the sorting positions 60 is independently associated with one pair of the contacts 58.

During the dwell period each of the diodes 48 is tested through its associated pair of contacts 58 and each of the sorting positions 60 associated with a pair of contacts engaged with one of the diodes having noise above a predetermined level is actuated. After expiration of the dwell period the testing fixture 26 is raised until the contacts 58 are disengaged from the leads 52. Rotation of the drum 22 then begins. The drum 28 also rotates simultaneously and with equal peripheral velocity to the rotation of the drum 22. Successive ones of the sorting positions 60 on the drum 28 becomes adjacent to successive ones of the feeding positions 32 of the drum 22 as mutual rotation of the two drums takes place.

As each of the actuated sorting positions 60 becomes adjacent one of the feeding positions 32, the diode 48 within that feeding position is transferred to the sorting position. If one of the sorting positions 62 is not actuated, the diode 48 over which that sorting position passes is not transferred to the sorting drum 28. Thus, it can be seen that the diodes 48 having a noise level below a predetermined standard remain on the feed drum 22 and the diodes having a noise level above a predetermined standard are transferred to the sorting drum 28.

A stationary cam 64 is positioned adjacent the sorting drum 28 to urge away the diodes from the sorting drum and into a collection chute 66. A second stationary cam 68 is provided adjacent the feed drum 22 for urging away the diodes 48 that remain on the feed drum after having been passed beneath the transfer drum 28. The diodes 48 which are urged away by the cam 68 drop into a collection chute 70.

FEEDING OPERATION

Referring to FIGS. 1 and 2, during rotation of the drum 22, the diodes that are held against the drum by the magnets 34 are brought into contact with fixed cams 72. The cams 72 are flat plates and are placed on both sides of the drum 22. Each of the cams 72 is provided with a curved end 74 that is positioned to engage leads 52 which are excessively bent. If the leads are excessively bent, the ends 74 of the cams 72 urge the leads away from the drum 22 thus preventing those ones of the diodes having excessively bent leads 52 from being processed further.

An air jet 76 is directed radially outwardly from the drum 22 near the position where the diodes 48 emerge from the feed bin 24. If one of the diodes 48 is not positioned on the drum 22 so that the body portion 50 of the diode is resting between two adjacent ones of the blocks 46, the leads 52 of the diode will not be in direct contact with the magnets 34. The magnetic force of attraction on the diode 48 which is not supported between the two blocks 46 will be low enough that the air from the jet 76 striking the leads 52 will knock the diode away from the drum 22. Thus, only the diodes 48 properly supported within their respective feeding positions 32 are permitted to progress past the air jet 76 and into the sorting operation.

TESTING OPERATION

Operation of the testing fixture 26 is best understood by referring to FIGS. 1, 2, 3, 4 and 5. After rotary motion of the drum 22 is stopped, air is admitted through an input port 78 to a cylinder 80 to lower the testing fixture 26. The testing fixture 26 includes an insulating block 82, a frame member 84 and slide bearings 86 to guide the fixture during its reciprocating travel. The slide bearings 86 are conventional ball bushings and are mounted to slide on smooth cylindrical rods 88 so that the fixture 26 can be easily reciprocated and so that the motion of the fixture follows an accurately defined straight line motion. The rods 88 are connected to the base 30 thus providing a referencing framework for the positioning of the testing fixture 26 with respect to the drum 22.

As the frame member 84 moves downwardly the contacts 58 are forced into engagement with the leads 52 with an inwardly wiping motion which helps to assure good electrical connection between the contacts and the leads. The portions of the contacts 58 shown in phantom represent the shape and position of the contacts after engagement with the leads 52.

Each of the contacts 58 is connected to a terminal 90. Each pair of the terminals 90 associated with one pair of the contacts 58, i.e., those two contacts which engage with one of the diodes 48, are each connected to one conventional noise determination test set 91 (FIG. 3) with flexible leads 92.

When the frame member 84 is in its lowered position, a cam 94 actuates a switch 96 which starts a test cycle. Engagement of the cam 94 with the switch 96 is indicated in phantom on FIG. 2. After completion of the cycle, air is admitted to an input port 98 of the cylinder 80 to raise the testing fixture 26 to the position shown in FIG. 2. When the fixture 26 is in a fully raised position, the frame member 84 actuates a switch 100 which starts the rotation period of indexing of the drum 22.

A cycle of operation can be considered to begin when the switch 96 is actuated by the downward motion of the fixture 26. The actuation of the switch 96 creates an input signal to a conventional delay flop circuit 102 having the logical property that the presence of a signal at an input terminal causes an output at a set output terminal marked "S" for a predetermined period of time following the application of the input signal. An output signal develops at a reset output terminal marked "R" after the predetermined period of time. The predetermined period of time between occurrence of the set output signal and the reset output signal is adjustable.

The introduction of the input signal to the delay flop circuit 102 causes an output at the "S" terminal thereof which output then becomes an input to a conventional delay circuit 104 and also an input to reset terminals marked "R" of a series of conventional flip-flops 106. Resetting of the flip-flops 106 causes the output terminals thereof marked "O" to be uniformly cleared of an output signal. The delay circuit 104 produces an input signal to the test circuit 91 after expiration of some predetermined period of time sufficient to allow resetting of the flip-flops 106.

The test circuit 91 is connected to the diodes 48 through the contacts 58 and the leads 92 and, upon receipt of a signal from the delay circuit 104, the test circuit begins its operation to detect noise level within the diodes supported under the testing fixture 26. There are 10 circuit paths through the test circuit 108, each of which is connected to a set terminal marked "S" of one of the flip-flops 106. Each of the flip-flops 106 is thus associated with one of the diodes 48 under test. If an excessive noise level is detected in any one of the diodes 48, the associated flip-flop 106 is set so that an output signal appears at the terminal "O."

Presence of an output signal at the "O" terminal of any one of the flip-flops 106 energizes one of a plurality of relays 110. Contacts of each of the relays 110 are connected in series with an electromagnet 111 in one of the sorting positions 60 of the sorting drum 28. The connection between the relays 110 and electromagnets 111 is made through a conventional slip ring assembly 112. Actuation of one of the relays 110 preconditions the associated electromagnets 111 for subsequent energization.

Energization of the preconditioned electromagnets occurs when the delay flop circuit 102 develops an output signal at the "R" terminal thereof. The output signal at the "R" terminal allows current to pass through the contacts of the energized relays 110 through the slip ring assembly 112 to the electromagnets 111.

Simultaneously with energization of the electromagnets 111, a signal is provided to an air cylinder control 114 to cause the cylinder 80 to raise the testing fixture 26 away from the drum 22. When the fixture 26 is raised to its uppermost level the switch 100 is actuated.

Actuation of the switch 100 provides a signal to a motor controller 116 which starts rotation of a motor 118 that rotates the drum 22. Connecting the motor 118 and the drum 22 is a shaft 120 having a drive gear 122 mounted thereon. The drive gear 122 is connected with idler gears 124 and 126 to drive a driven gear 128 that is mounted on a shaft 130 rotatably supporting the sorting drum 28. At one end of the shaft 130 there is mounted a rotating cam designated generally by the numeral 132.

The ratio between the gear 122 and the gear 128 is 5:1 so that the angular velocity of the drum 22 is one-fifth the angular velocity of the drum 28. Thus, a 72° rotation of the drum 22 accomplishes one complete revolution of the drum 28 and also the cam 132. At the end of the one complete revolution of the cam 132 an indentation 134 formed in the cam is positioned so that an actuator 136 of a switch 138 drops into the indentation thus actuating the switch.

Actuation of the switch 138 provides a stop signal to the motor controller 116 thus stopping rotation of the motor 118. Photocell arrangements and other prior art signalling systems can also be used to perform the signalling function. Simultaneously with this stop signal, a signal is provided to the air cylinder control 114 at a "Down" terminal thereof to cause the air cylinder 80 to lower the testing fixture 26. When the switch 96 is actuated against a test cycle is completed. A cycle can also be started by operating a manual start switch 139.

TRANSFER OPERATION

The transfer operation and interrelation between the feed drum 22 and the sorting drum 28 can be best understood by referring to FIGS. 4, 6, 7, 8 and 9. The feed drum 28 includes a body portion 140 having cavities 142 cut into a portion of the periphery thereof. The angular spacing between centers of the cavities 142 is five times the angular spacing between centers of the notches 44 of the drum 22. One of the electromagnets 111 is inserted into each of the cavities 142. Each of the electromagnets 111 includes a coil portion 144 and an armature portion 146. An apertured retaining band 148 passes over the coils 144 of the electromagnets 111 to retain the electromagnets within their respective cavities 142. Terminal screws 149 are provided to connect leads of the coils 144 to the slip ring assembly 112.

A notched flange 150 is mounted at each end of the body portion 140. The respective axes of the drum 28 and the drum 22 are spaced such that portions of the flanges 150 of the drum 28 overlie an area of each flange 42 of the drum 22. The spacing between the axes of the drums 22 and 28 is great enough however, that the outermost surfaces of the armatures 146 do not strike the supporting surface 40 of the drum 22 during mutual rotation of the two drums.

Figure 7:
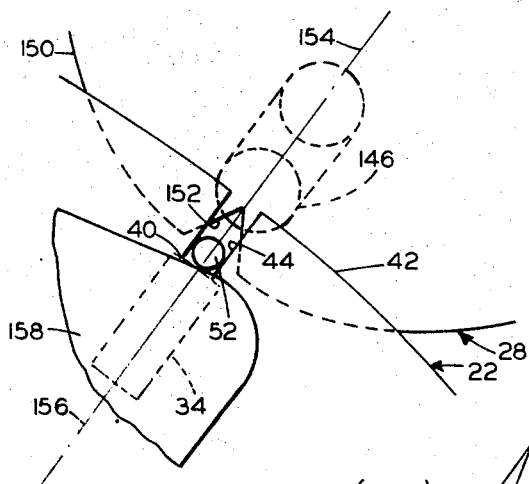
FIG. 7 is a greatly enlarged view of the sorting drum and feed drum of FIG. 6 illustrative of a period in time just prior to transfer of an article from the feed drum to the sort drum.
Figure 8:
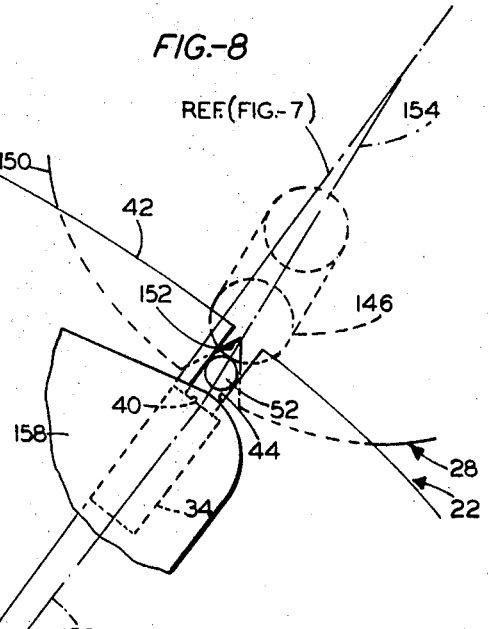
FIG. 8 is an illustration of the objects of FIG. 7 at a period in time when the transfer of the article takes place.
Figure 9:
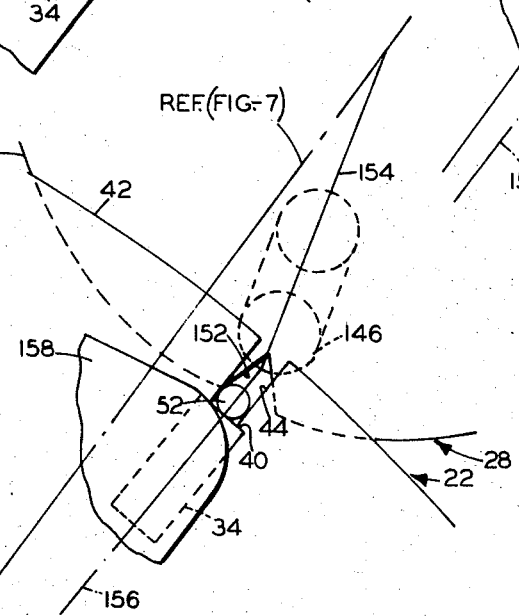
FIG. 9 is an illustration of the objects of FIG. 7 at a period of time after that illustrated in FIG. 8.

FIGS. 7, 8 and 9 show a greatly enlarged view of an interrelationship between the notches 44 of the drum 22 and notches 152 of the flanges 150. In FIG. 7, it can be seen that radial lines 154 and 156 passing through centers of the notches 152 and 44, respectively, form a straight line. FIG. 7, in this case, illustrates the point in time at which the outermost surface of the armature 146 is closest to the supporting surface 40 of the drum 22. The notches 152 and 44 are in completely overlying relationship so that the lead 52 is constrained within one or the other of the notches.

It is desirable that transfer not take place at this time when the lines 154 and 156 form a single straight line. It is preferable that the transfer take place when the lines 154 and 156 have assumed a position like that illustrated in FIG. 8.

FIG. 8 represents a situation where rotation has proceeded further than that illustrated in FIG. 7 and the spacing between the armature 146 and the supporting surface 40 is becoming greater than that which existed in FIG. 7. It is desirable that transfer take place after this spacing has developed beyond its minimum in order to have complete assurance that transfer does not occur at a time *prior* to that which is illustrated in FIG. 7.

If transfer took place before the minimum spacing of FIG. 7 existed, there is some probability that the leads 52 that had been transferred to the armature 146 would ultimately be retransferred back to engagement with the permanent magnets 34 in the drum 22. If retransfers occurred the machine 20 would fail to sort correctly. By designing the system to transfer as shown in FIG. 8 and explained above, undesirable retransfers from the sorting drum 28 back to the feed drum 22 are eliminated.

Due to the high speeds at which transferring takes place within the sorting machine 20, it is quite difficult to design the permanent magnets 34 and the electromagnets 111 with fields effective to cause transfer in exactly the manner shown in FIG. 8. In order to overcome these magnetic field design difficulties, lift cams designated generally by the numeral 158 are utilized to lift the leads 52 away from the permanent magnets at the time when transfer is desired. The magnetic field of the electromagnet 111 is not great enough to attract the leads 52 away from the permanent magnets 34 without the intervention of the cams 158 lifting the leads away from the permanent magnets 34 which retain them within the cavities 44.

The cams 158 are mounted adjustable on brackets 160 so that the exact positioning of the cams can be determined after final positioning of the drums 22 and 28 and after the gear train has been installed to establish rotational timing between the drums. It is only after rotational timing and axial spacing between the drums 22 and 28 is finally established that the positioning of the cams 158 is completed.

FIG. 9 illustrates a situation in which the electromagnet 111 has not been energized. In other words, the diode 48 associated with the lead 52 which is illustrated in FIG. 9 is one that has a noise level below the predetermined standard. The degree of rotation illustrated in FIG. 9 is greater than that of FIG. 8 and is illustrative of a point in rotation beyond that where transfer would be desired. It can be seen that the lead 52 has reached a point on the surface of the cam 158 where the lead can now be drawn back to the drum 22 by the field of the permanent magnet 34. By comparing FIGS. 7, 8 and 9, it can be seen that the two notches 152 and 44 are still interrelated throughout these figures so that the lead contained therebetween has not had an opportunity to escape. The two notches do not separate from one another until after there has been an opportunity for the diodes 48, which have not been attracted to the sorting drum 28, to be drawn back to their respective permanent magnets 34 on the feed drum 22. Thus, it is clear that complete and positive control of the diodes in the area of transfer is always available.

Because of the precise and positive control over the position of the diodes 48 that is obtainable with the sorting machine 20 it is possible to feed the diodes 48 into the machine at a high rate, typically about 36,000 per hour. The dwell period of 1.8 seconds during testing reduces the rate of actual output of the machine 20 to about 9,000 diodes per hour. Of course, the final output rate is limited by the dwell period and not the rate at which transfers of the diodes can take place.

It should be noted that none of the structural elements of the machine must undergo rapid acceleration in order to achieve a transfer rate of 36,000 articles per hour. The drums 22 and 28 must rotationally accelerate to come up to transfer speed from dwell but these accelerations are quite nominal and impact loading with associated rapid wearing of parts does not develop.

While an electromagnet has been described as the actuable element of sorting positions 60, it should be recognized that the sorting positions could be operated with permanent magnets placed therein which can be selectively rotated, in the manner of conventional permanent magnet-type chucks, to place their respective magnetic fields in appropriate position for attracting the diodes 48 upon determination of a high noise level.

In addition, it should be recognized that while the invention has been described with a rotatable feed drum, the principle of the invention would still be embodied in a system utilizing a feeding means which is linear or otherwise noncircular. Similarly, the invention would be embodied in a system utilizing feed means wherein the articles are supported by something other than magnetic positions, for example vacuum chucks or spring clips might be appropriate.

What we claim is:

1. A method for sorting magnetic articles having a predetermined characteristic from magnetic articles not having such characteristic, comprising the steps of:

engaging a testing fixture with a plurality of spaced magnetic articles to detect the articles having the predetermined characteristic;

actuating selectively a like plurality of magnetic sorting positions spaced about the periphery of a rotatable drum, each position being actuated in response to detection of the predetermined characteristic in one of the plurality of articles;

disengaging said testing fixture from said plurality of articles;

rotating said drum in proximity to said plurality of articles to progressively bring successive ones of the sorting positions into adjacent relationship with successive ones of the plurality of articles so that the actuated ones of the positions magnetically attract the articles having the predetermined characteristic; and collecting the articles attracted to the drum separately from the articles not attracted to the drum, thereby sorting the articles in accordance with the articles having or not having the predetermined characteristic.

2. The method of sorting of claim 1 which comprises the additional step of:

feeding the articles in clusters, each cluster having an equal number of the articles, to the testing fixture in alternating periods of movement and dwell, each period of movement being sufficient to bring one cluster into alignment with the testing fixture, and the sorting is effected on the clusters of articles in synchronism with the feeding.

3. The method of sorting of claim 2 wherein:

the step of feeding is accomplished by holding the articles about the periphery of a second drum and indexing said drum in alternating periods of rotation and dwell;

wherein the step of rotating the first drum is performed during the periods of rotation of said drum; and wherein said two drums rotate at equal peripheral velocities.

4. The method of sorting of claim 3 wherein the articles are held about the second drum magnetically, by magnets attached thereto, the force of magnetic attraction to the second drum being sufficiently high so that the sorting positions of the first drum does not attract the articles away from contact with the magnets of the second drum, and comprising the additional step of camming away each of the articles from their associated magnets on the second drum during rotation thereof at a position beyond a point of minimum spacing between the article and associated sorting position of the first drum in the direction of rotation to permit an actuated one of the sorting positions to attract the cammed article whereby said articles are positively transferred to the first drum as desired and subsequent reattraction from the first drum to the second drum is avoided.

5. The method of sorting of claim 3 wherein the number of sorting positions on the first drum is equivalent to the number of articles in each of the clusters and the positions are deactuated after each period of rotation of the drums whereby said positions are conditioned for selective actuation after each engagement of the testing fixture with the articles.

6. Apparatus for sorting magnetic articles having a predetermined characteristic from magnetic articles not having such characteristic, comprising:

means for feeding the articles at a predetermined rate;

means positioned adjacent said feeding means and engageable with the articles for detecting the articles having the predetermined characteristic;

a sorting drum having means mounted thereon for producing a selective magnetic field at predetermined portions of the peripheral surface thereof, said sorting drum being positionable adjacent said feeding means and beyond the detecting means in the direction of feeding to magnetically attract the articles from the feeding means during relative motion of said means and drum; and means, responsive to the detection, by the detecting means, of the articles having said characteristic, for rendering effective said magnetic field to attract said articles and remove them from the holding and feeding means and transfer them to the sorting drum, whereby the articles having said characteristic are sorted from those not having said characteristic.

7. The apparatus of claim 6 wherein the feeding means comprises a rotatable feed drum having means spaced about the peripheral surface thereof for holding the articles thereon.

8. The apparatus of claim 7 wherein the sorting drum is rotatable.

9. The apparatus of claim 8 wherein means are provided for simultaneously rotating the feed drum and the sorting drum to establish substantially the same peripheral velocity between said drums.

10. An apparatus for sorting magnetic articles having a predetermined characteristic from magnetic articles not having such characteristic, comprising:
a rotatable feed drum;
magnetic means spaced about and mounted to the peripheral surface of said drum for removably holding the articles thereon;
means positioned adjacent said drum and engageable with the held articles for detecting the articles having the predetermined characteristic;
a rotatable sorting drum having means mounted thereon for producing a selective magnetic field at predetermined portions of the peripheral surface thereof, said sorting drum being substantially adjacent said feed drum and positioned beyond the detecting means in the direction of rotation of the feed drum and located to magnetically attract the articles from portions of the peripheral surface of the feed drum as said drums rotate;
means for simultaneously rotating the feed drum and the sorting drum to establish substantially the same peripheral velocity between said drums; and
means, responsive to the detection by the detecting means of the articles having said characteristic, for rendering effective said magnetic field to attract said articles and remove them from the feed drum and transfer them to the sorting drum, whereby the articles having said characteristic are sorted from those not having said characteristic.

11. The apparatus for sorting of claim 10, which comprises stationary cam means, positioned in the area of adjacency of the two drums beyond a point of minimum spacing between the two drums in the direction of rotation, for lifting successive ones of the articles away from the feed drum, during rotation thereof, wherein the magnetic fields of the sorting drum are sufficiently low that the articles will be attracted to the sorting drum only after being lifted by the cam means, whereby said articles are transferred positively with reduced probability of being retransferred from the sorting drum to the feed drum.

12. The apparatus for sorting of claim 10:
wherein the magnetic holding means are discreet testing positions spaced about the feed drum in clusters, each cluster containing an equal plurality of the testing positions;
wherein means are provided for indexing the feed drum about its axis in alternating steps of rotation and dwell, each rotational step being equivalent to the angular displacement between the centers of adjacent clusters; and
wherein the detecting means are engageable with each of the positions of successive ones of the clusters during each step of dwell.

13. The apparatus of claim 12:
wherein the sorting drum is provided with a plurality of discreet, selective magnetic field producing means equivalent to the number of positions in each of the clusters of the feed drum;
wherein means are provided to render ineffective the selective magnetic field after each complete revolution of the sorting drum; and
wherein each step of rotation of the feed drum corresponds to one complete revolution of the sorting drum and said rendering effective of the magnetic field of the sorting drum occurs after each step of rotation of the feed drum.

14. Apparatus for testing and sorting electrically functional articles having axial magnetic leads, which comprises:
a flanged rotatable cylindrical feed drum having magnetic testing positions formed on the peripheral surface thereof for retaining the electrical devices, each of the positions having at least one notch formed into the drum flange, each of the positions being oriented and shaped to retain one of the articles substantially parallel to the axis of the drum, the drum having an axial dimension less than the axial dimension of the articles so that the leads of the articles extend over the ends of the drum, and the positions being arranged in clusters equally spaced about the peripheral surface, each cluster containing an equal number of positions;
magnetic feed means engageable with successive portions of the peripheral surface of the drum for feeding the articles to the engaged portion of said surface;
means for indexing the drum about its axis in alternating steps of rotational movement and of dwell, each rotational step being equivalent to the angular displacement between the centers of adjacent clusters;
air jet means, directed radially from the axis of the drum at a position where successive portions of the peripheral surface of the drum emerge from the magnetic feed means, for applying a predetermined pneumatic force to the articles to remove those articles from the peripheral surface which are not within one of the testing positions;
a fixture engageable with successive portions of the peripheral surface of the drum for testing the articles, the fixture having a pair of contacts and a signal producing means connectable with each testing position of a cluster, each contact of the pairs being disposed to contact one lead of one of the retained articles when the fixture is engaged with a portion of the drum, and the signal producing means being responsive to a predetermined test characteristic of the associated article;
means operable in synchronism with the indexing means both for raising the test fixture to disengage the contacts from the peripheral surface of the drum as the drum moves and for lowering the test fixture to engage the contacts with the leads thereunder as the drum dwells;
a rotatable sorting drum having a cylindrical body portion and flanges positioned on each end of the body portion, the drum having electromagnetic sorting positions spaced about the peripheral surface thereof, the peripheral spacing between the sorting nests being substantially equivalent to the peripheral spacing between the testing nests, the number of sorting nests being equal to the number of testing positions in each of the clusters of the testing drum, each of the sorting positions having an electromagnet positioned therein and including notches formed into each of the flanges, the body portion of the sorting drum having an axial dimension at least as great as the axial dimension of the testing drum, the sorting drum being positioned with respect to the testing drum such that a portion of each of the flanges of the sorting drum overlies a portion of each flange of the testing drum and the area of overlying relationship is displaced angularly from the testing fixture in the direction of rotational movement of the testing drum;
driven means for synchronizing rotational movement of the sorting drum and the testing drum to equalize the peripheral velocities of both drums so that each of the sorting positions is substantially adjacent to a predetermined one of the testing positions of each of the clusters during rotational movement of the testing drum when the testing position is within the area of overlying relationship;

means responsive to the signal producing means for selectively energizing each of the electromagnets in the sorting positions upon the occurrence of the test characteristic so that upon rotational movement of the two drums a device having such characteristic is removed from its testing position by electromagnetic attraction to the sorting position which is adjacent said testing position when the testing position is in said area of overlying relationship;

stationary cam means positioned outwardly of the flanges of the sorting drum and adjacent the area of overlying relationship of the portions of flanges and the portions of ends of the testing drum to move the leads of the device, passing thereover during rotational movement of the drums, outwardly into a cavity which is momentarily formed by adjacent ones of the notches of the testing drums and of the flanges, to reduce the effect of the magnetic field of the testing positions on the leads to assist the attraction of the leads by the energized electromagnets in the sorting positions;

means for deenergizing all of the electromagnets in the sorting positions after completion of each indexing of the testing drum and prior to any actuation of the positions by signals from the test fixture;

first means for stripping and collecting articles having said test characteristics from the sorting drum; and second means for stripping and collecting articles not having such test characteristic from the testing drum which have not been attracted by the electromagnets of the sorting drum.

15. A method for sorting articles having a predetermined characteristic from articles not having such characteristic, comprising the steps of:

engaging a testing fixture with a plurality of spaced articles to detect the articles having the predetermined characteristic;

actuating selectively a like plurality of attractive sorting positions spaced about the periphery of a rotatable drum, each position being actuated in response to detection of the predetermined characteristic in one of the plurality of articles;

disengaging said testing fixture from said plurality of articles;

rotating said drum in proximity to said plurality of articles to progressively bring successive ones of the sorting positions into adjacent relationship with successive ones of the plurality of articles so that the actuated ones of the positions attract the articles having the predetermined characteristic; and collecting the articles attracted to the drum separately from the articles not attracted to the drum, thereby sorting the articles in accordance with the articles having or not having the predetermined characteristic.

16. The method of sorting of claim 15, which comprises the additional step of:

feeding the articles in clusters, each cluster having an equal number of the articles, to the testing fixture in alternating periods of movement and dwell, each period of movement being sufficient to bring one cluster into alignment with the testing fixture, and the sorting is effected on the clusters of articles in synchronism with the feeding.

17. The method of sorting of claim 16 wherein:

the step of feeding is accomplished by holding the articles about the periphery of a second drum and indexing said drum in alternating periods of rotation and dwell;

wherein the step of rotating the first drum is performed during the periods of rotation of said second drum; and wherein said two drums rotate at equal peripheral velocities.

18. The method of sorting of claim 17 wherein the number of sorting positions on the first drum is equivalent to the number of articles in each of the clusters and the positions are deactuated after each period of rotation of the drums whereby said positions are conditioned for selective actuation after each engagement of the testing fixture with the articles.

19. Apparatus for sorting articles having a predetermined characteristic from articles not having such characteristic, comprising:

means for feeding the articles at a predetermined rate;

means positioned adjacent said feeding means and engageable with the articles for detecting the articles having the predetermined characteristic;

a sorting drum having means mounted thereon for producing a selective attractive force field at predetermined portions of the peripheral surface thereof, said sorting drum being positionable adjacent said feeding means and beyond the detecting means in the direction of feeding to attract the articles from the feeding means during relative motion of said means and drum; and means, responsive to the detection, by the detecting means, of the articles having said characteristic, for rendering effective said field to attract said articles and remove them from the holding and feeding means and transfer them to the sorting drum, whereby the articles having said characteristic are sorted from those not having said characteristic.

20. The apparatus of claim 19 wherein the feeding means comprises a rotatable feed drum having means spaced about the peripheral surface thereof for holding the articles thereon.

21. The apparatus of claim 20 wherein the sorting drum is rotatable.

22. The apparatus of claim 21 wherein means are provided for simultaneously rotating the feed drum and the sorting drum to establish substantially the same peripheral velocity between said drums.